(No Model.)

E. E. SHOOTER.
ANIMAL TRAP.

No. 420,021. Patented Jan. 21, 1890.

WITNESSES
Will E. Aughinbaugh
Charles M. Bates

INVENTOR
E. E. Shooter
By Wm. H. Bates
Attorney ary partitions and provided with a central vertical

UNITED STATES PATENT OFFICE.

EDWARD E. SHOOTER, OF MAXTON, NORTH CAROLINA, ASSIGNOR OF ONE-HALF TO OCTAVIUS H. BLOCKER, OF SAME PLACE.

ANIMAL-TRAP.

SPECIFICATION forming part of Letters Patent No. 420,021, dated January 21, 1890.

Application filed December 4, 1889. Serial No. 332,560. (No model.)

*To all whom it may concern:*

Be it known that I, EDWARD E. SHOOTER, a citizen of the United States, residing at Maxton, in the county of Robeson and State of North Carolina, have invented certain new and useful Improvements in Animal-Traps; and I do hereby declare the following to be a full, clear, and exact description of the invention, such as will enable others skilled in the art to which it appertains to make and use the same.

My invention relates to that class of animal-traps in which a coiled spring is employed to serve as a motor for a revolving vertical shaft provided with radial wings or partitions, by means of which the animals as they enter a door in the side of a suitable box, attracted by bait secured to a trigger therein, are carried past the door and through a suitable opening in the bottom of the box into a receptacle containing water, placed beneath the box to receive them.

To this end the invention consists in the novel construction and arrangement of parts, as will be hereinafter more particularly described, and specifically pointed out in the claim.

Figure 1:
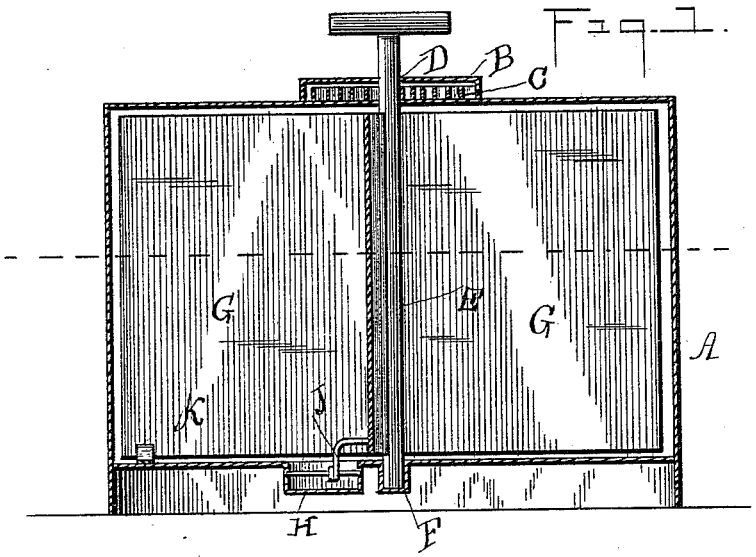
Figure 2:
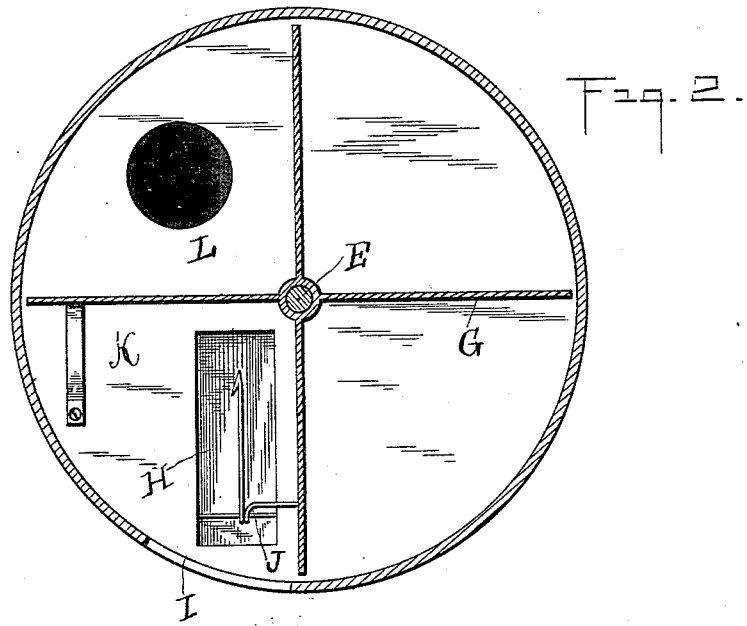

In the annexed drawings, to which reference is had and which fully illustrate my invention, Figure 1 is a sectional elevation of my improved trap; and Fig. 2 is a top or plan view of the same, taken on the line $xx$, Fig. 1.

Similar letters of reference indicate corresponding parts in both figures.

Referring to the drawings, A indicates a vertical box of cylindrical form.

B is an annular recess or housing formed concentrically with and secured centrally upon the top of the box A, in which a coiled spring C is inclosed.

D is a perforation formed centrally through the housing and top of the box A. Through this perforation D a revolving shaft E is passed, the lower end of which is stepped into a recesss F, formed centrally in the bottom of the box, the coil-spring in the housing encircling the upper part of the shaft. This shaft carries a suitable number of radial wings or partitions G, the free ends of which nearly contact with the sides of the box and just leaving sufficient room for their revolution.

H is a rectangular depression formed in the bottom of the box near a door or opening I in the side of the same. Within this rectangular depression is pivotally secured a trigger J, composed, by preference, of a piece of wire twisted around and secured to a short transverse piece which is pivotally secured to the sides of the rectangular depression H, as above mentioned, the free ends of that portion of the trigger which holds the bait being barbed and bent at right angles to each other at the pivotal point, and the longer end of which serves as a counterpoise for holding the shorter end in its proper position relatively to the wings or partitions of the shaft E, as clearly shown in Fig. 2 of the drawings.

K is a curvilinear tripping catch or stop secured to the bottom of the box near one side and upon the inside thereof, which prevents the wings from revolving too far in the opposite direction around the box.

L is an opening in the bottom of the box, through which the animal falls into a suitable receptacle beneath the same, after being carried around by the partial revolution of the shaft and its partition to the opening.

Operation: The spring having been fully coiled or wound up and the bait secured to the trigger, the animal enters the door or opening in the side of the box to secure the bait, and in so doing he pulls the trigger and frees the same from its normal position against one of the wings of the revolving shaft, which puts in motion the revolving shaft through the medium of the coiled spring, and he is carried around by the wings or partitions of said shaft past the door and down through the opening in the bottom of the box into a suitable water-holding receptacle to receive him, the trigger resetting itself for repeated operations when the spring is again fully wound up and the trigger again released from the wing, as hereinbefore stated.

Having thus described my invention, what I claim as new, and desire to secure by Letters Patent, is—

An animal-trap comprising a cylindrical cage having vertically-rotating spring-actuated partitions therein and an opening in one side of the bottom thereof communicating with a vessel over which said trap is placed, in combination with a pivoted lever located in a recess in the bottom of said trap and having its longer arm barbed for retaining bait and lying flat in said recess, and its shorter arm upturned for engagement with one of the partitions, and a spring-stop to prevent backward motion of the partitions.

In testimony whereof I affix my signature in presence of two witnesses.

EDWARD E. SHOOTER.

Witnesses:
 O. H. BLOCKER,
 O. S. HAYES.